(12) United States Patent
Jones et al.

(10) Patent No.: US 9,984,355 B2
(45) Date of Patent: May 29, 2018

(54) SYSTEMS AND METHODS FOR MONITORING LOCATION OF PRODUCTS ON SHELVES AT A RETAIL SALES FACILITY

(71) Applicant: Wal-Mart Stores, Inc., Bentonville, AR (US)

(72) Inventors: Matthew A. Jones, Bentonville, AR (US); Nicholaus A. Jones, Fayetteville, AR (US); Robert J. Taylor, Rogers, AR (US)

(73) Assignee: Wal-Mart Stores, Inc., Bentonville, AR (US)

( * ) Notice: Subject to any disclaimer, the term of this patent is extended or adjusted under 35 U.S.C. 154(b) by 0 days. days.

(21) Appl. No.: 15/437,763

(22) Filed: Feb. 21, 2017

(65) Prior Publication Data

US 2017/0249587 A1    Aug. 31, 2017

Related U.S. Application Data

(60) Provisional application No. 62/299,984, filed on Feb. 25, 2016.

(51) Int. Cl.
| | |
|---|---|
| *G08B 19/00* | (2006.01) |
| *G06Q 10/08* | (2012.01) |
| *G08B 21/24* | (2006.01) |

(52) U.S. Cl.
CPC .......... *G06Q 10/087* (2013.01); *G08B 21/24* (2013.01)

(58) Field of Classification Search
CPC .......... G08B 13/1427; G08B 13/2497; G08B 13/08; G08B 29/183; G08B 25/10; B60C 19/00

(Continued)

(56) References Cited

U.S. PATENT DOCUMENTS 6,107,928 A *  8/2000  Gatti ................... G08B 13/149
                                                  340/568.1
6,349,244 B1 *  2/2002  Bardin ................ G06Q 10/087
                                                     221/108

(Continued)

FOREIGN PATENT DOCUMENTS

| | | |
|---|---|---|
| GB | 2307560 | 5/1997 |
| JP | 2007010208 | 1/2007 |
| WO | 2010133478 | 11/2010 |

OTHER PUBLICATIONS

Moorthy, Rahul, etc.; "On-Shelf Availability in Retailing"; vol. 116-No. 23; International Journal of Computer Applications; Apr. 2015; pp. 47-51.

*Primary Examiner* — George Bugg
*Assistant Examiner* — Munear Akki
(74) *Attorney, Agent, or Firm* — Fitch, Even, Tabin & Flannery LLP

(57) ABSTRACT

In some embodiments, apparatuses, systems, and methods of monitoring product placement on shelves at a retail sales facility include at least one torque measurement sensor proximate at least one mounting location of a shelf on a sales floor of the retail facility. The torque measurement sensor is configured to measure a torque exerted by at least one product located on the shelf relative to a fulcrum of the shelf, and to send a signal to an electronic inventory management device including a processor-based control unit. The control unit of the electronic inventory management device is configured to receive electronic data associated with the at least one product and to estimate a weight distribution of the at least one product on the shelf based on the received electronic data and the measured torque.

16 Claims, 5 Drawing Sheets

(58) Field of Classification Search
USPC .............. 340/568.1, 522, 686.1, 999, 539.1
See application file for complete search history.

(56) References Cited

U.S. PATENT DOCUMENTS

| | | | |
|---|---|---|---|
| 7,233,241 B2 | 6/2007 | Overhultz | |
| 7,495,561 B2 | 2/2009 | Bodin | |
| 8,676,377 B2* | 3/2014 | Siegel | G06Q 10/08 |
| | | | 221/4 |
| 9,367,831 B1* | 6/2016 | Besehanic | G06Q 10/087 |
| 2005/0086133 A1* | 4/2005 | Scherer | G06Q 10/087 |
| | | | 705/28 |
| 2005/0193834 A1* | 9/2005 | May | G01D 5/145 |
| | | | 73/862.331 |
| 2006/0071774 A1* | 4/2006 | Brown | G06Q 10/087 |
| | | | 340/522 |
| 2006/0175415 A1* | 8/2006 | Kimura | G06Q 10/00 |
| | | | 235/487 |
| 2009/0248198 A1* | 10/2009 | Siegel | G06Q 10/08 |
| | | | 700/231 |
| 2011/0282768 A1* | 11/2011 | Swafford, Jr. | A47F 1/126 |
| | | | 705/28 |
| 2013/0002422 A1* | 1/2013 | Wiese | G08B 13/08 |
| | | | 340/539.1 |
| 2014/0201041 A1* | 7/2014 | Meyer | G06Q 10/087 |
| | | | 705/28 |
| 2016/0026032 A1* | 1/2016 | Moore | G06K 7/10316 |
| | | | 382/103 |

* cited by examiner

SYSTEMS AND METHODS FOR MONITORING LOCATION OF PRODUCTS ON SHELVES AT A RETAIL SALES FACILITY

RELATED APPLICATIONS

This application claims the benefit of U.S. Provisional Application No. 62/299,984, filed Feb. 25, 2016, which is incorporated herein by reference in its entirety.

TECHNICAL FIELD

This invention relates generally to managing products at retail sales facilities and in particular, to monitoring relative positions of products on display shelves at retail sales facilities.

BACKGROUND

Workers at retail sales facilities such as large department stores typically perform different tasks related to inventory management and stocking. One such task revolves around zoning product-displaying shelves on the sales floor of the retail sales facility to move the products that remain on the shelves (after the consumers purchase some of the products) toward the front end of the shelves so that the products are most visible and accessible to the consumers. For example, if multiple units of a product are taken off a front end of the shelf by the consumers and purchased, the products that remain on the shelf would be located at the rear end of the shelf and not as visible to subsequent consumers. Accordingly, zoning of shelves at a retail sales facility by moving remaining products toward the front end of the shelves improves product visibility and facilitates the sales of more products.

One disadvantage of conventional product management systems is that they do not indicate which shelves on the sales floor of the retail sales facilities need zoning, requiring workers at the retail sales facility to walk around the sales floor to visually monitor all of the shelves on the sales floor, and to zone the shelves, when appropriate. Given that a sales floor of a given retail sales facility may have thousands of shelves and hundreds of thousands of products, finding shelves that need to be zoned is a very time consuming task and requires substantial worker time resources, increasing operational costs for retail sales facilities.

BRIEF DESCRIPTION OF THE DRAWINGS

Disclosed herein are embodiments of systems, apparatuses and methods pertaining to the monitoring product placement on shelves at a retail sales facility. This description includes drawings, wherein.

Figure 1:
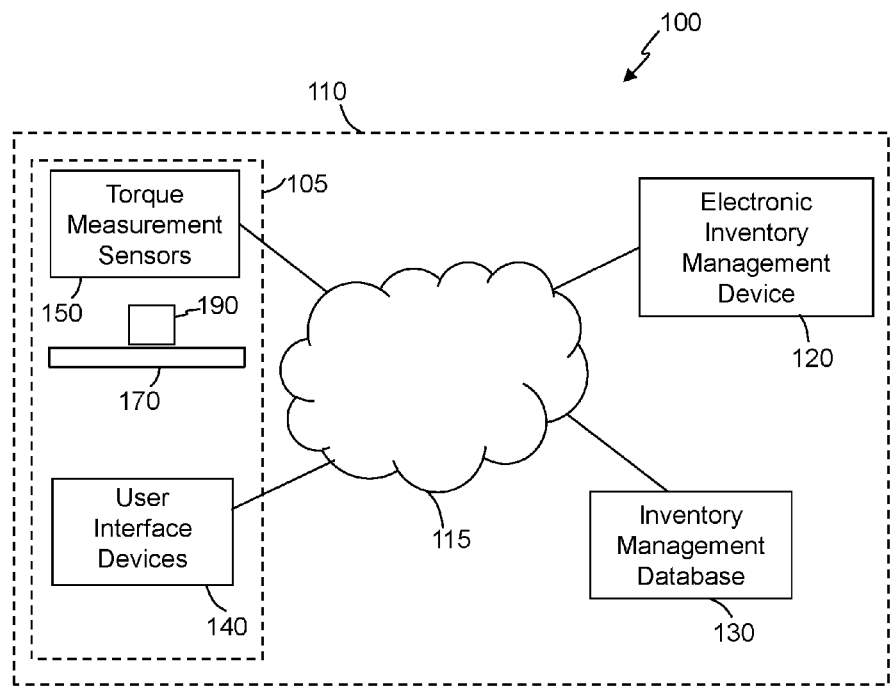
FIG. 1 is a block diagram of a system of monitoring product placement at a retail sales facility in accordance with some embodiments.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common, well-understood elements that are useful or necessary in a commercially feasible embodiment are often not depicted in order to facilitate a less obstructed view of these various embodiments of the present invention. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

The following description is not to be taken in a limiting sense, but is made merely for the purpose of describing the general principles of exemplary embodiments. Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Generally speaking, this application describes systems and methods of monitoring product placement on shelves at a retail sales facility via at least one torque measurement sensor proximate at least one mounting location of a shelf on a sales floor of the retail facility. The torque measurement sensor is configured to measure a torque exerted by products located on the shelf relative to a fulcrum of the shelf, and to send a signal to an electronic device configured to receive electronic data associated with the products and to estimate a weight distribution of the products on the shelf based on the received electronic data and the measured torque.

In one embodiment, a system for monitoring product placement on shelves at a retail sales facility includes at least one torque measurement sensor proximate at least one mounting location of a shelf on a sales floor of the retail facility, the at least one torque measurement sensor being configured to measure a torque exerted by at least one product located on the shelf relative to a fulcrum of the shelf; and to send a signal to an electronic inventory management device including a processor-based control unit; and wherein the control unit is configured to receive electronic data associated with the at least one product and estimate a weight distribution of the at least one product on the shelf based on the received electronic data and the measured torque.

In another embodiment, a method of monitoring product placement on shelves at a retail sales facility includes: providing at least one torque measurement sensor proximate at least one mounting location of a shelf on a sales floor of the retail facility; measuring, via the at least one torque measurement sensor, a torque exerted by at least one product located on the shelf relative to a fulcrum; sending a signal from the at least one torque measurement sensor to an electronic inventory management device including a processor-based control unit; and receiving electronic data associated with the at least one product and estimating a weight distribution of the at least one product on the shelf based on the received electronic data and the measured torque.

FIG. 1 shows a system 100 for monitoring product positions on shelves on a sales floor 105 of at a retail sales facility 110 according to some embodiments. The system 100 may be utilized in a single retail sales facility 110 (e.g., brick-and-mortar location where consumer products are sold and/or stocked), or may extend across multiple retail sales facilities 110. It will be appreciated that the system 100 may be utilized not only for monitoring the positions of products on product display locations such as shelves on the sales floor 105 of the retail sales facility 110, but also for monitoring products in product storage locations such as shelves in a stock room of the retail sales facility 110.

The exemplary system 100 of FIG. 1 includes an electronic inventory management device 120. The electronic inventory management device 120 facilitates the management of the inventory of products 190 at the retail sales facility 110, and the monitoring of the positioning of and the zoning of products 190 on shelves 170 on the sales floor 105 of the retail sales facility 110, based on electronic data obtained from other electronic devices at the retail sales facility 110, including but not limited to inventory management database 130, user interface device 140, and torque measurement sensors 150, which will be discussed in more detail below. The term "zoning" will be understood by those of ordinary skill in the art as the process of pulling products 190, which remain on the shelf after some products are purchased by the consumers, toward the front end of the shelf 170 in order to make the products that remain on the shelf better visible to the consumers and easier to access by the consumers when looking at a shelf and standing next to the shelf.

The electronic inventory management device 120 of FIG. 1 may be a stationary or portable electronic device, for example, a desktop computer, a laptop computer, a tablet, a mobile phone, or any other electronic device including a processor-based control circuit (i.e., control unit). The electronic inventory management device 120 may include and/or couple to one or more wired and/or wireless distributed communication network 115 (e.g., wide area network (WAN), local area network (LAN), wireless local area network (WLAN), Internet, cellular, other such networks, and combinations of such networks. The electronic inventory management device 120 is configured for data entry and one-way and/or two-way communication via the communication network 115 with, for example, an inventory management database 130, a user interface device 140, torque measurement sensors 150, and/or any other computing device located at the retail sales facility 110 or remote to the retail sales facility 110 (e.g., regional server). It will be appreciated that the electronic inventory management device 120 may be implemented as one computing device or a series of computing devices in wired or wireless communication with one another.

In the embodiment shown in FIG. 1, the system 100 includes an inventory management database 130 configured to store electronic information associated with the products at the retail sales facility, torque measurement data generated by and obtained from torque measurement sensors 150 at the retail sales facility 110, worker tasks generated based on the torque measurement data obtained and processed by the electronic inventory management device 120, unique identifiers of the torque measurement sensors 150, and electronic data associating locations of shelves 170 with each of the torque measurement sensors 150, as well as predetermined threshold torque values associated with each of the products 190 stored on shelves 170 on the sales floor 105 of the retail sales facility 110.

While the inventory management database 130 is shown in FIG. 1 as being separate from the electronic inventory management device 120 and in communication with the electronic inventory management device 120 via the communication network 115, it will be appreciated that the inventory management database 130 may be physically incorporated into and/or be electrically coupled (e.g., via a cable) to the electronic inventory management device 120. In addition, while one inventory management database 130 is shown in FIG. 1, the inventory management database 130 may include two or more separate databases, for example, a product inventory database and a torque measurement values database.

The inventory management database 130 may be stored, for example, on non-volatile storage media (e.g., a hard drive, flash drive, or removable optical disk) internal to or external to relative to the electronic inventory management device 120. The inventory management database 130 may be stored on one or more servers or may be cloud-based. In some embodiments, the electronic data stored in the inventory management database 130 may be received from the electronic inventory management device 120. In some embodiments, the electronic data stored in the inventory management database 130 may be transmitted to the inventory management database 130 from other devices such as torque measurement sensors 150.

In some embodiments, the electronic inventory management device 120 is in communication via the network 115 with one or more user interface devices 140. The user interface device 140 can be any electronic device configured for wired and/or wireless communication with the electronic inventory management device 120 and/or any other electronic device at the retail sales facility 110. The user interface devices 140 allow a user (e.g., a worker at the retail sales facility 110) to communicate with the electronic inventory management device 120 to receive and/or transmit information relevant to locations of products 190 on the shelves 170 on the sales floor 105 of the retail sales facility 110, and tasks to be performed by workers at the retail sales facility 110 relative to the products 190. For example, in some embodiments, the user interface device 140 of a worker may receive alerts relating to variations in positions of products 190 on the shelves 170 on the sales floor 105 and/or alerts relating to tasks to be performed by the worker. The user interface device 140 may include but is not limited to a smart phone, cell phone, tablet, laptop, retail sales facility-specific wireless communication devices (e.g., electronic hand-held product scanners), or the like.

Figure 3:
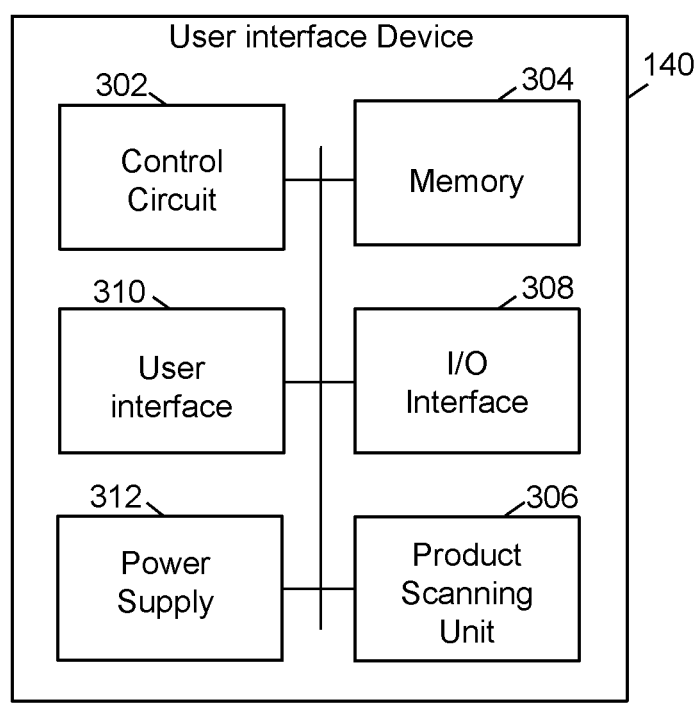
FIG. 3 shows a simplified block diagram of an exemplary user interface device, in accordance with some embodiments.

With reference to FIGS. 1 and 3, the exemplary system 100 includes one or more torque measurement sensors 150 positioned proximate one or more mounting locations of product-containing shelves 170 on the sales floor 105 of the retail sales facility 110. The torque measurement sensors 150 are configured to measure a torque (i.e., force) exerted by the products 190 displayed on the shelves 170 to the consumers. The torque measurement sensors 150 are also configured to send signals via the communication network 115 to the electronic inventory management device 120 and/or the inventory management database 130 and/or the user interface devices 140. Such signals may include electronic data representing torque values measured by torque measurement sensors 150.

The torque measurement sensors 150 may be configured to continuously transmit signals including torque measurement data to the electronic inventory management device 120 to provide real-time torque values for each product-containing shelf 170 at the retail sales facility 110. Alternatively, the torque measurement sensors 150 may be configured to intermittently transmit signals including torque measurement data to the electronic inventory management device 120 to provide torque values for each shelf 170 at the retail sales facility 110 at regular predetermined time intervals, for example, every minute, every two minutes, every 5 minutes, every 15 minutes, every 30 minutes, every 1 hour. The predetermined time intervals may also be irregular in some embodiments. Each of the torque measurement sensors 150 preferably includes a unique identifier that identifies the shelf 170 that is associated with the torque measurement sensor 150. The electronic data representing the unique identifiers of the torque measurement sensors 150 and indicating the association of each torque measurement sensor 150 with a specific shelf 170 on the sales floor 105 may be stored in the inventory management database 130. As such, when torque measurement data from a torque measurement sensor 150 is received in the inventory management database 130, the torque measurement data is associated with the identifier of the torque measurement sensor 150 and with the physical location of the shelf where the torque measurement sensor 150 is installed.

Figure 2:
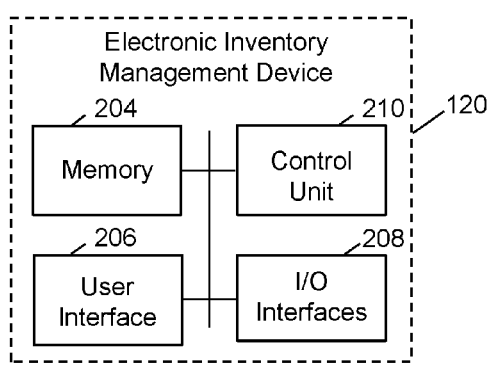
FIG. 2 is a simplified block diagram of an electronic inventory management device in accordance with some embodiments.

FIG. 2 shows a simplified block diagram of an exemplary electronic inventory management device 120, in accordance with some embodiments. The electronic inventory management device 120 includes one or more processor-based control circuits or control unit 210, memory 204, and input/output (I/O) interfaces 208. The electronic inventory management device 120 also includes one or more user interfaces 206 that allows users to interact with the inventory management database 130, user interface device 140, and/or torque measurement sensors 150.

In some embodiments, the control unit 210 includes one or more processors and/or microprocessors. The control unit 210 couples with and/or includes the memory 204. Generally, the memory 204 stores the operational code or set of instructions that is executed by the control unit 210 and/or processor to implement the functionality of the electronic inventory management device 120. It is understood that the control unit 210 may be implemented as one or more processor devices as are well known in the art. Similarly, the memory 204 may be implemented as one or more memory devices as are well known in the art, such as one or more processor readable and/or computer readable media and can include volatile and/or nonvolatile media, such as RAM, ROM, EEPROM, flash memory and/or other memory technology. In some embodiments, the control unit 210 comprises a fixed-purpose hard-wired platform or can comprise a partially or wholly programmable platform. These architectural options are well known and understood in the art and require no further description here. The control unit 210 can be configured (for example, by using corresponding programming as will be well understood by those skilled in the art) to carry out one or more of the steps, actions, and/or functions described herein.

While the memory 204 is shown as internal to the electronic inventory management device 120, the memory 204 can be internal, external or a combination of internal and external memory. Also, the electronic inventory management device 120 may include a power supply (not shown) or it may receive power from an external source. In some instances, the control unit 210 and the memory 204 may be integrated together, such as in a microcontroller, application specification integrated circuit, field programmable gate array or other such device, or may be separate devices coupled together.

The one or more I/O interfaces 208 allow wired and/or wireless communication coupling of the electronic inventory management device 120 to external components, such as inventory management database 130, user interface device 140, and/or torque measurement sensors 150, and other components of the system 100. Accordingly, the I/O interfaces 208 may include any known wired and/or wireless interfacing device, circuit and/or connecting device. For example, in some implementations, the I/O interface 208 includes one or more transceivers, receivers, and/or transmitters that provide wireless communication in accordance with one or more wireless protocols (e.g., Wi-Fi, Bluetooth, radio frequency (RF), cellular, other such wireless communication, or combinations of such communication).

The user interface 206 of the electronic inventory management device 120 can include substantially any known input device, such one or more buttons, knobs, selectors, switches, keys, touch input surfaces and/or displays, etc. Additionally, the user interface 206 may include one or more output display devices, such as lights, visual indicators, display screens, etc. to convey to a user any information relating to positions or products 190 on shelves 170 at the retail sales facility 110 and/or worker tasks associated therewith. While FIG. 2 illustrates the exemplary components of the electronic inventory management device 120 being coupled together via a bus, it is understood that the components may actually be coupled to the control unit 210 and/or one or more other components directly.

In some embodiments, the electronic inventory management device 120 is configured to receive, from a torque measurement sensor 150 mounted proximate a mounting location of a shelf 170 on a sales floor 105 of the retail facility 110, torque measurement sensor data indicating the torque exerted by one or more products 190 located on the shelf 170 relative to a fulcrum of the shelf 170. In some embodiments, based on such torque measurement sensor data received from the torque measurement sensor 150, the control unit 210 of the electronic inventory management device is programmed to estimate a weight distribution of one or more products 190 on the shelf 170. In some embodiments, the torque measurement sensor data is stored on the inventory management database 130 and may be obtained by the electronic inventory management device 120 as a result of the control unit 210 sending a signal including a request for the torque measurement sensor data associated with one or more shelves 170 to be retrieved from the inventory management database 130 and/or another electronic database.

In some embodiments, the control unit 210 of the electronic inventory management device 120 is programmed to correlate torque measurement sensor data, generated by a torque measurement sensor 150 associated with a given shelf 170 on the sales floor 105 to a predetermined threshold torque value associated with one or more products 190 on that shelf 170. Such predetermined threshold torque values may be stored on (and retrieved by the control unit 210 from) the inventory management database 130 and/or another electronic database. As discussed above, the inventory management database 130 may store known threshold torque values associated with each product 190 displayed on sales floor shelves 170 of the retail sales facility 110. The optimal space on a shelf 170 for displaying a product 190 to consumers is usually the front-most space (i.e., space at the front end of the shelf 170).

A product 190 positioned at the front end of a shelf 170 exerts a higher amount of torque on the fulcrum of the shelf 170 (which is mounted to a support structure at its rear edge) as compared to any of the other positions of that product 190 between the front and rear ends of the shelf 170. Accordingly, in some embodiments, the predetermined threshold torque value associated with each product 190 on a shelf 170 is the torque value exerted by the product 190 when in the optimal position for being displayed on that shelf 170 to the consumers. In some embodiments, the predetermined threshold torque value associated with the shelf 170 is the total torque value exerted by all of the products 190 positioned on that shelf 170 when initially stocked for display to consumers and before any of the products 190 are purchased by the consumers. As such, this predetermined threshold torque value represents the torque on the shelf 170 at maximum on-shelf-availability of the products 190 on the shelf 170.

When consumers remove a product 190 from a shelf on the sales floor 105, the torque on the shelf 170 exerted by the products 190 on the fulcrum of the shelf 170 decreases. Accordingly, if the torque measurement sensor data received at the electronic inventory management device 120 a given point in time from the torque measurement sensor 150 associated with that shelf 170 indicates a torque value below the predetermined threshold torque value, the control unit 210 is programmed to interpret this value as an indication that one or more products 190 have been removed from the shelf 170 by the consumers during the preceding time interval. In some embodiments, the control unit 210 of the electronic inventory management device 120 is programmed to determine, in response to an indication of a torque value below or above the predetermined threshold torque value that the shelf 170 contains an incorrect product 190 that does not belong on the shelf 170. For example, if all the correct products 190 that are to be displayed on the shelf 170 are identical and each have a predetermined threshold torque value of 2 ounce (oz)-inch (in), and a product 190 located on the shelf 170 was determined to exert a torque of 1 oz-in, then the control unit 210 is programmed to interpret the value of 1 oz-in as an indication that an incorrect product 190 has been displayed on the shelf 170, and to generate an alert instructing a worker at the retail sales facility 110 to remove the incorrect product 190 from the shelf 170. In another example, if the predetermined total threshold value for all the correct products 190 displayed on the shelf 170 is 20 oz-in, and the total torque value was determined to be 25 oz-in, then the control unit 210 is programmed to interpret the value of 25 oz-in as an indication that an incorrect product 190 has been displayed on the shelf 170, and to generate an alert instructing the worker to remove the incorrect product 190 from the shelf 170

Consumers typically first remove the product that is closest to their reach and easiest to take off the shelf 170, i.e., the product 190 having the front-most (i.e., closest to the front end) position on the shelf 170. As a result, the remaining and now first available product 190 on the shelf is further away from the front end of the shelf 170, and is less visible and harder to reach for the consumers than the product 190 that was removed from the shelf 170 by the consumer for purchase. In addition, when consumers remove products 190 from a shelf 170 on the sales floor 105, they sometimes remove more than one product 190, and sometimes inadvertently shift other products 190 on the shelf 170 while attempting to reach and grab their product 190 of interest.

To enable the electronic inventory management device 120 to monitor the positions of products 190 on a shelf 170 after one or more consumers remove products 190 from the shelf 170 and/or shift products 190 away from their initial display positions, and to facilitate appropriately timed zoning of a shelf 170 by a worker at the retail sales facility 110, the control unit 210 of the electronic inventory management device 120 is programmed to estimate a position of the products on the shelf 170 in response to a determination by the control unit 210 that the measured torque value is below the predetermined threshold torque value stored in the inventory management database 130. For example, the control unit 210 of the electronic inventory management device 120 is programmed in some embodiments to determine a distance of one or more products 190 on the shelf 170 relative to the one or more torque measurement sensors 150 associated with that shelf 170.

In some embodiments, the control unit 210 of the electronic inventory management device 120 is programmed to determine an estimated position of one or more products 190 on the shelf 170 based on at least in part on electronic torque measurement sensor data received from the torque measurement sensor 150 at the electronic inventory management device 120 (and/or the inventory management database 130) via the network 115. More specifically, the control unit 210 is programmed in some embodiments to determine that the estimated position of one or more products 190 on the shelf 170 supports moving one or more products 190 on the shelf 170 further away from the rear end of the shelf and closer to the front end of the shelf 170. In such embodiments, in response to a determination by the control unit 210 that the estimated position of a product 190 on the shelf 170 supports moving the product 190 closer to the front end of the shelf 170, the control unit 210 is programmed to generate an alert (e.g., to a worker at the retail sales facility 110) indicating that the product 190 on the shelf 170 is to be moved further away from a rear end of the shelf 170 and closer to a front end of the shelf 170.

After products 190 are removed from the shelf 170 and purchased by the consumers, the workers at the retail sales facility 110 are typically tasked with replenishing the products 190 displayed to consumers on the shelf 170 on the sales floor 105, such that the availability of the products 190 on the shelf 170 is at or near maximum at any given time. When a product 190 is taken off the shelf 170 by a consumer, the replenishment of this product 190 typically requires a worker at the retail sales facility 110 to pick an identical product 190 from a bin or shelf in the stock room and to bring (or have another worker bring) the picked product 190 to the sales floor 105 for placement on the shelf 170 in place of the sold product 190.

To facilitate the replenishment of products 190 following sales to consumers, and to increase the on-shelf-availability of products 190 on the shelves 170 on the sales floor 105, the control unit 210 of the electronic inventory management device 120 is programmed in some embodiments to determine, based on torque measurement data received from torque measurement sensor 150, that a product 190 was removed (e.g., by a consumer) from the shelf 170, and to generate an alert indicating that a product 190 identical to the product 190 removed from the shelf 170 is to be brought from a stock room and placed on the shelf 170 to replace the removed product 190. In some embodiments, the control unit 210 of the electronic inventory management device 120 is programmed to transmit such an alert to the user interface device 140, which in turn may either visually display such an alert (e.g., on an electronic display) to the worker, or may generate an audible instruction relaying this alert (e.g., via a speaker) to the worker. In other embodiments, the control unit 210 of the electronic inventory management device 120 is programmed to transmit such an alert to an optional alert interface device mounted on the shelf 170 and configured to generate a visual (e.g., blinking light, red light, etc.) alert or an audible alert (beep, verbal command, etc.) to a worker when the worker is in physical proximity to the shelf 170 and can either see or hear the alert generated by the electronic interface device.

FIG. 3 shows a simplified block diagram of a user interface device 140, in accordance with some embodiments. The exemplary user interface device 140 includes one or more control circuits 302, memory 304, product scanning unit 306, input/output (I/O) interface 308, user interface 310, and power supply 312. In some embodiments, the control circuit 302 includes one or more processors and/or microprocessors. The memory 304 stores the operational code or set of instructions that is executed by the control circuit 302 and/or processor to implement the functionality of the user interface device 140. In some embodiments, the memory 304 may also store some or all of particular data that may be needed to make any of the associations, determinations, measurements and/or communications described herein. Such data may be pre-stored in the memory, received from an external source (e.g., the electronic inventory management device 120), be determined, and/or communicated to the user interface unit.

The control circuit 302 and/or processor may be implemented as one or more processor devices as are well known in the art. Similarly, the memory 304 may be implemented as one or more memory devices as are well known in the art, such as one or more processor readable and/or computer readable media and can include volatile and/or nonvolatile media, such as RAM, ROM, EEPROM, flash memory and/or other memory technology. Further, the memory 304 is shown as internal to the user interface device 140, but the memory 304 can be internal, external or a combination of internal and external memory.

Generally, the control circuit 302 and/or electronic components of the user interface device 140 can include fixed-purpose hard-wired platforms or can comprise a partially or wholly programmable platform. These architectural options are well known and understood in the art and require no further description here. The user interface unit and/or control circuit can be configured (for example, by using corresponding programming as will be well understood by those skilled in the art) to carry out one or more of the steps, actions, and/or functions described herein. In some implementations, the control circuit 302 and the memory 304 may be integrated together, such as in a microcontroller, application specification integrated circuit, field programmable gate array or other such device, or may be separate devices coupled together.

The product scanning unit 306 of the exemplary user interface device 140 in FIG. 3 is configured to scan (e.g., via radio waves) identifying indicia on a product 190 in order to identify the product 190 and/or to view and/or to enter worker tasks associated with the product 190. The identifying indicia on the products 190 that may be scanned by the product scanning unit 306 may include, but is not limited to: two dimensional barcode, radio frequency identification (RFID), near field communication (NFC) identifiers, ultra-wideband (UWB) identifiers, Bluetooth identifiers, images, or other such optically readable, radio frequency detectable or other such code, or combination of such codes. To that end, the product scanning unit 306 according to some embodiments may include a barcode reader, RFID reader, optical reader, or the like.

The I/O interface 308 of the exemplary user interface device 140 of FIG. 3 allows wired and/or wireless communication coupling of the user interface device 140 to external components, such as the electronic inventory management device 120, inventory management database 130, and/or torque measurement sensor 150. Typically, the I/O interface 308 provides at least wireless communication (e.g., Wi-Fi, Bluetooth, cellular, RF, and/or other such wireless communication), and in some instances may include any known wired and/or wireless interfacing device, circuit and/or connecting device, such as but not limited to one or more transmitter, receiver, transceiver, etc.

The user interface 310 may be used for user input and/or output display. For example, the user interface 310 may include any known input devices, such one or more buttons, knobs, selectors, switches, keys, touch input surfaces, audio input, and/or displays, etc. Additionally, the user interface 310 may include one or more output display devices, such as lights, visual indicators, display screens, etc. to convey information relevant to the monitoring of the positioning of products 190 on shelves 170 and/or indication of worker tasks (e.g., to zone a shelf 170 after some of the products were taken off the shelf 170 by consumers, to pick a replenishment product 190 from a bin in a stock room, etc.) to a user such as a worker at the retail sales facility 110. The user interface 310 in some embodiments may also include audio systems that can receive audio commands or requests verbally issued by a user, and/or to output audio content such as audible alerts (e.g., a beep or a verbal instruction identifying the shelf to be zoned) to the worker.

The exemplary user interface device 140 according to FIG. 3 may include a power supply 312 that may be rechargeable and/or it may receive power from an external source. While FIG. 3 illustrates the components of the user interface device 140 being coupled together via a bus, it is understood that the components of the user interface device 140 may be coupled to the control circuit 302 and/or one or more other components directly.

Figure 4A:
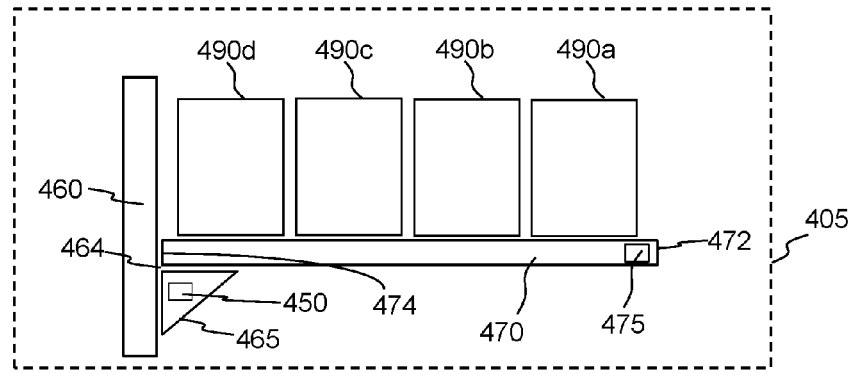
FIG. 4A illustrates a simplified side elevational view of an exemplary product display shelf supporting products and including a torque measurement sensor in accordance with some embodiments.

FIG. 4A illustrates a simplified view of an exemplary product display shelf 470 including products 490*a-d* displayed thereon and coupled at a mounting location 464 via a mounting device 465 relative to an upstanding support structure 460 located on a sales floor 405 of a retail sales facility. The exemplary product display shelf 470 has a front end 472 and a rear end 474, and is mounted such that the rear end 474 of the shelf 470 is located proximate the support structure 460 while the front end 472 of the shelf 470 is located distal to the support structure 460.

In FIG. 4A, the product 490a is positioned at the front end 472 of the shelf 470. The products 490b-d are positioned behind the product 490a such that the product 490d is furthest away from the front end 472 of the shelf and closest to the rear end 474 of the shelf 470 and to the support structure 460. Thus, a consumer standing in an aisle on the sales floor and looking at the front end 472 of the shelf 470 would see the product 490a and not see the products 490b-d, since they are located behind the product 490a. By the same token, the product 490a would be the easiest for the consumer to access and remove from the shelf 470, while the product 490d would be the most difficult for the consumer to access and remove from the shelf 470.

While the products 490a-d on the shelf 470 in FIG. 4A are identical and have the same weight, each of the products 490a-d, when exerting a downward force on the shelf 470 due to gravity, results in a different torque relative to a fulcrum at the mounting location 464. Specifically, the product 490a (which is closest to the front end 472 and furthest from the rear end 474 and the fulcrum-like mounting location 464) exerts the highest amount of torque and the product 490d (which is closest to the rear end 474 and the fulcrum-like mounting location 464 and furthest from the front end 472) exerts the lowest amount of torque. For example, when the product 490d is in its original position in FIG. 4B, the force F exerted by the product 490d in the downward direction indicated by the arrow in FIG. 4B results in a lower torque at the mounting location 464 than the amount of torque at the mounting location 464 in FIG. 4C that results from the downward (indicated by arrow) force F exerted by the product 490d after the product 490d is moved to the front end 472 of the shelf 470, for example, as a result of a zoning task completion by a worker.

Figure 4B:
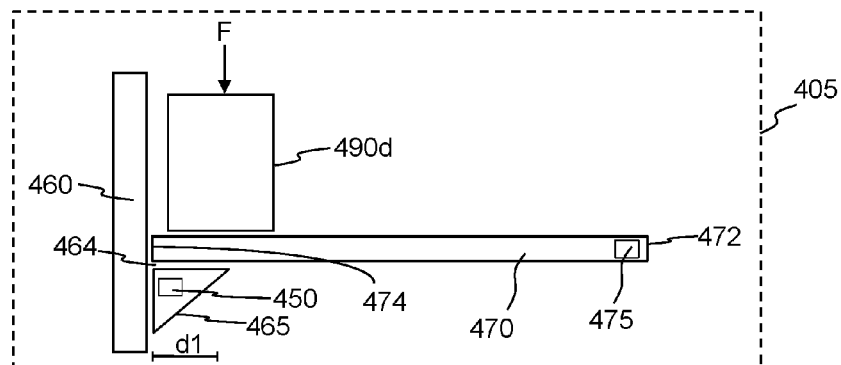
FIG. 4B is the same view as in FIG. 4A, but illustrating the shelf after three of the fore products have been removed by the consumers.
Figure 4C:
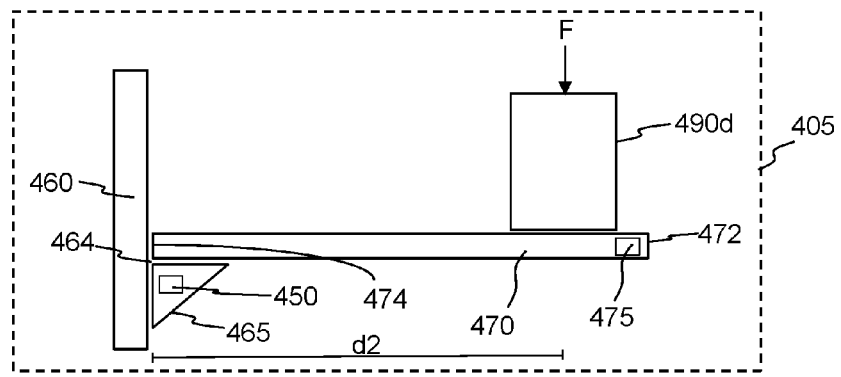
FIG. 4C is the same view as in FIG. 4B, but illustrating the shelf after the remaining product on the shelf is zoned (i.e., placed at the front of the shelf)

In the embodiment shown in FIGS. 4A-C, the shelf 470 includes a torque measurement sensor 450 proximate the mounting location 464 of the mounting device 465 to the upstanding support structure 460. As discussed in more detail below, a shelf 470 may have two or more torque measurement sensors 450. The torque measurement sensor 450 is configured to measure the torque exerted by the products 490a-d relative to the fulcrum-like mounting location 464 and to transmit the measured torque values via the network 115 to the inventory management database 130, or to the electronic inventory management device 120, which in turn may transmit the torque values received from the torque measurement sensor 150 to the inventory management database 130. The inventory management database 130 may thus store historical torque measurement data associated with each shelf 470 at the retail sales facility 110.

The weight of each product 490a-d is known and is stored in some embodiments in the inventory management database 130, enabling the control unit 210 of the electronic inventory management device 120 to estimate a weight distribution of the products 490a-d on the shelf 470 based on the torque measurement data retrieved from the inventory management database 130. In some embodiments, the inventory management database 130 stores predetermined threshold torque values representing a torque exerted by each of the products 490a-d when in the initial display positions shown in FIG. 4A, and the predetermined threshold torque values representing a total torque that would be exerted on the shelf 470 when all four products 490a-d are present on the shelf 470 in their initial display positions (i.e., the shelf 470 is fully stocked as in FIG. 4A).

In some embodiments, the control unit 210 of the electronic inventory management device 120 is programmed to retrieve from the inventory management database 130 the torque measurement data transmitted from the torque measurement sensor 450 to the inventory management database 130, and to correlate the retrieved torque measurement data to a predetermined threshold torque value stored in the inventory management database 130 in association with each of the products 490a-d on the shelf 470. In other words, based on the known predetermined total torque value associated with the shelf 470 when fully stocked with products 490a-d, the torque exerted by one or more products 490a-d on the shelf 470 (which is measured by the torque measurement sensor 450) provides an indication of whether the shelf 470 is fully stocked with products 490a-d, whether one or more products 490a-d are missing from the shelf 470 (e.g., as a result of being purchased by consumers), whether the shelf 470 was replenished with one or more products, and/or whether the shelf 470 is empty and has no products thereon. For example, in response to a determination by the control unit 210 that the torque value received from the torque measurement sensor 450 is below the predetermined historical threshold torque value stored in the inventory management database 130, the control unit 210 is programmed to interpret this determination as an indication that one or more of the products 490a-d has been removed from the shelf 470, and to generate a zoning task and/or an alert for the shelf 470.

Since the products 490a-d are identical and a predetermined torque value for each of the products 490a-d in their initial position on the shelf 470 (FIG. 4A) is known, when consumers remove products 490a-c off the shelf 470 and product 490d is the only product remaining on the shelf 470 (as shown in FIG. 4B), the torque measurement data measured by the torque measurement sensor 450 and transmitted to the inventory management database 130, when correlated by the control unit 210 against the predetermined torque values stored in the inventory management database 130, would be consistent with the torque value stored in association with the product 490d in its initial position. However, if a worker at the retail sales facility 110 zoned the shelf 470 by moving the product 490d to the front end 472 of the shelf (as shown in FIG. 4C), the torque value correlated by the control unit 210 against the predetermined torque values stored in the inventory management database 130 would be consistent with the torque value stored in association with the product 490a in its initial display position, which is occupied in FIG. 4C by the product 490d. Thus, the correlation of the torque measurement values by the control unit 210 in real-time against stored historical predetermined torque values for the products 490a-d displayed on the shelf 470 permits the control unit 210 to determine how many of products 490a-d remain on the shelf and to determine the weight distribution of the products 490a-d and/or the locations of each of the remaining products 490a-d on the shelf 470.

Figure 5A:
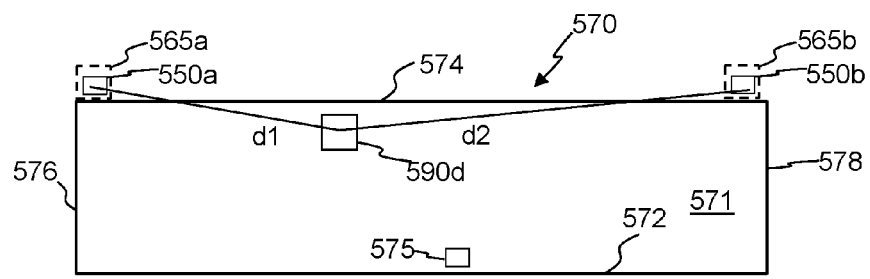
FIG. 5A illustrates a simplified top plan view of another exemplary product display shelf supporting a product in its initial display position and including torque measurement sensors in accordance with some embodiments.
Figure 5B:
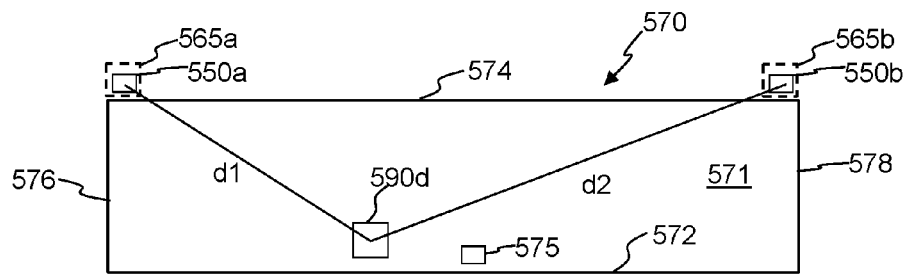
FIG. 5B is the same view as in FIG. 5A, but illustrating the exemplary product display shelf after the remaining product is zoned (i.e., placed at the front end of the shelf)

In some embodiments, in response to a determination by the control unit 210 that the torque value received from the torque measurement sensor 450 is below the predetermined threshold torque value stored in the inventory management database, the control unit 210 is programmed to estimate a physical location of one or more of the remaining products 490a-d on the shelf 470. A physical location of any of the products 490a-d on the shelf 470 may be determined by correlating the torque measurement data measured by the torque measurement sensors 450 associated with the shelf 470. For example, when the product 590d is positioned on the shelf 570 as shown in FIGS. 5A and 5B, each of the torque measurement sensors 550a and 550b measures a torque exerted by the product 590d relative to a fulcrum at the mounting location of the mounting devices 565a and 565b to their respective support structures. Based on the torque value measured by each of the torque measurement sensors 550a and 550b and transmitted by the torque measurement sensors 550a and 550b to the inventory management database 130, the control unit 210 of the electronic inventory management device 120 determines a distance d1 from the torque measurement sensor 550a to the product 590d and a second distance d2 from the second torque measurement sensor 550b to the product 590d. This determination of the distances d1 and d2 from each of the torque measurement sensors 550a and 550b to the product 590d enables the control unit 210 to estimate the physical location of the product 590d on the shelf 570, and to determine whether the estimated position of the product 590d on the shelf 570 supports moving the product 590d further away from a rear end 574 of the shelf 570 and closer to a front end 572 of the shelf 570 (i.e., to zone the shelf 570).

In some embodiments, the torque measurement values measured by the torque measurement sensors 550a and 550b enable the control unit 210 to estimate the side-to-side location of the product 590d on the shelf 570, i.e., to determine whether the product 590d is closer to the first side 576 of the shelf 570 or to the second side 578 of the shelf 570. For example, the torque measurement values measured by the torque measurement sensors 550a and 550b enable the control unit 210 in some embodiments to estimate a weight distribution percentage of products on the shelf 570 from the first side 576 to the second side 578 (i.e., left to right/right to left). In other words, if the torque measurement values measured by the torque measurement sensors 550a and 550b indicate that the product 590d exerts 60 percent of its torque on the torque measurement sensor 550a and 40 percent of its torque on the torque measurement sensor 550b, then the control unit 210 is enabled to determine that the product 590d is positioned closer to the first side 576 of the shelf 570 and approximately 40 percent of the distance from the first side 578 of the shelf 570 to the second side 576 of the shelf 570. In some embodiments, the control unit 210 is programmed, upon a determination of a side-to-side location of the product 590d between the first side 576 of the shelf 570 and the second side 578 of the shelf 570 deemed by the control unit 210 to be inappropriate, to cause the electronic inventory management device to send an alert to the user interface device 140 of a worker in order to instruct the worker to position the product 590d in an appropriate side-to-side location on the shelf 570.

When the product 590d is the only product remaining on the shelf 570 is estimated by the control unit 210 of the electronic inventory management device 120 to be in its initial display position at the rear end 574 of the shelf 570 (i.e., in a position akin to the position of the product 490d in FIG. 4B), the control unit 210 is programmed in some embodiments to generate an alert indicating that the shelf 570 is to be zoned, i.e., that the product 590d is to be moved further away from the rear end 574 of the shelf and closer to the front end 572 of the shelf 570 such that the product 590d is easier for the consumers to see and access. For example, in the embodiment shown in FIG. 5A, the control unit 210 would generate a zoning task instructing a worker at the retail sales facility 110 to zone the shelf 570 by moving the sole remaining product 590d from its initial display position at the rear end 574 of the shelf 570 to a position located at the front end 572 of the shelf 570 as in FIG. 5B to make the product 590d more visible to consumers and easier to access by the consumers. A worker task associated with the zoning task that the control unit 210 is programmed to generate in some embodiments is a pick task, which would instruct a worker to go to the stock room of the retail sales facility 110 and to pick additional units of the products 490a-c from a storage bin in the stock room and to bring the picked products 490a-c to the sales floor 105 to replenish the empty spaces on the shelf 470.

In some embodiments, the control unit 210 is programmed to cause the electronic inventory management device 120 to send an alert signal to a user interface device 140 of a worker indicating the generation, by the control unit 210, of a zoning task and/or a pick task. Such an alert may be in the form of a displayed message on the user interface 310 of the user interface device 140, or may be in the form of an audible beep or spoken verbal command on the user interface 310 of the user interface device 140. A worker receiving such an alert via the user interface device 140 would then perform the appropriate task (e.g., zoning and/or picking).

In some embodiments, instead of, or in addition to sending an alert signal to the user interface device 140 of a worker to indicate the generation of a zoning task by the control unit 210, the control unit 210 is programmed to cause the electronic inventory management device 120 to send an alert signal to an alert interface device 575 mounted proximate to the front end 572 of the shelf 570. The alert interface device 575 may be a single light or series of lights, a speaker, and/or a visual display configured to generate a visual (e.g., blinking light, red light, etc.) alert or an audible alert (beep, verbal command, etc.) to a worker when the worker is in physical proximity to the shelf 570, prompting the worker seeing or hearing the alert to perform the task of zoning with respect to the shelf 570. In some embodiments, after the worker performs the zoning task by moving the product 590d from its initial display position in FIG. 5A to the zoned position at the front end 572 of the shelf 570, the control unit 210 is programmed to confirm whether the worker performed the zoning task by correlating the newest torque values provided by the torque measurement sensors 550a and 550b against the predetermined torque values stored in the inventory management database 130 and/or by processing the torque values provided by the torque measurement sensors 550a and 550b to determine the new physical location of the product 590d.

Referring back to FIGS. 4A-C, the mounting device 465 may be a hinge, bracket, frame, clip, hook, T-bar, or the like mounting structures that are configured to permit detachable or permanent coupling of the shelf 470 to an upstanding (e.g., vertical and/or slanted) support structure 460 such as a frame, upright, rod, or the like. The shelf 470 may be mounted relative to the support structure 460 via a single mounting device 465, two mounting devices 465, three mounting devices 465, four mounting devices 465, or more than four mounting devices 465.

For example, in the embodiment shown in FIGS. 5A and 5B, the shelf 570 may be mounted via at least two mounting devices 565, a first mounting device 565a proximate an intersection of the rear end 574 of the shelf 570 and a first side 576 of the shelf 570, and a second mounting device 565b proximate an intersection of the rear end 574 of the shelf 570 and a second side 578 of the shelf 570. The shelf 570 may, in some embodiments, be mounted via four mounting devices 565 such that a third mounting device is positioned below the mounting device 565a and a fourth mounting device is positioned below the mounting device 565b.

Figure 6:
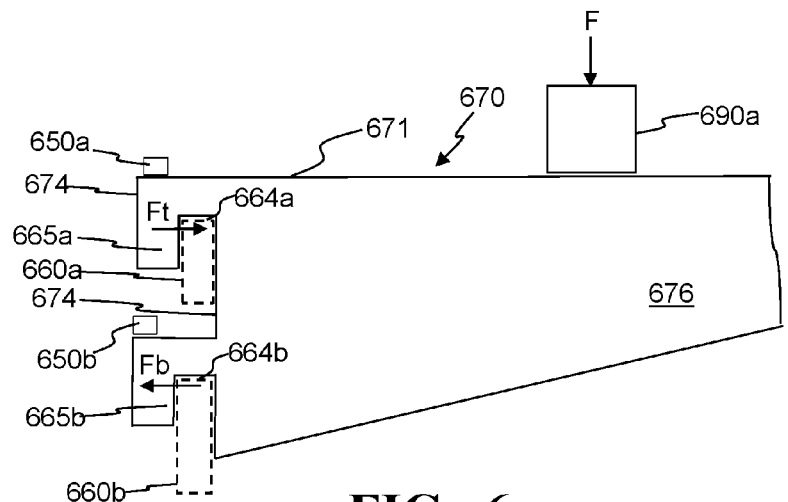
FIG. 6 illustrates a simplified top plan view of another exemplary product display shelf supporting a product in its initial display position and including torque measurement sensors in accordance with some embodiments.

FIG. 6 illustrates one exemplary arrangement of mounting a shelf 670 via a top (i.e., upper) mounting device (i.e., hook) 665a coupled to support structure 660a and a bottom (i.e., lower) mounting device (i.e., hook) 665b positioned below the top mounting device 665a. In the embodiment shown in FIG. 6, the top and bottom mounting devices 665a and 665b are located proximate to the first side 676 of the shelf 670 akin to the mounting device 565a in FIGS. 5A-5B, and it will be appreciated that the shelf 670 may include a second pair of mounting devices identical to the mounting devices 665a and 665b proximate to the second side of the shelf 670. The second side of shelf 670 is not visible in FIG. 6, but is akin to second side 578 of FIG. 5A.

The presence, and more specifically, the weight, of the product 690a on the 670 exerts a downward force on the upper-facing surface 671 of the shelf due to gravity. Since the shelf 670 is mounted to the upstanding support structures 660a and 660b via two hook-like mounting devices 665a and 665b as shown in FIG. 6, the weight of the product 690a exerts a torque or force ($F_t$) at the fulcrum-like mounting location 664a of the top mounting device 665a to the support structure 660a in a direction indicated by the right-facing arrow. Similarly, the weight of the product 690a exerts a torque or force ($F_b$) at the fulcrum-like mounting location 664b of the bottom mounting device 665b to the support structure 660b in a direction indicated by the left-facing arrow. A first torque measurement sensor 650a is mounted proximate the mounting location 664a to measure the torque $F_t$, and a second torque measurement sensor 650b is mounted proximate the mounting location 664b to measure the torque $F_b$.

It will be appreciated that the size of the torque measurement sensors 650a and 650b in FIG. 6 is not drawn to scale. It will also be appreciated that while the torque measurement sensors 650a and 650b are shown in FIG. 6 as being positioned on top of the hook-like mounting deices 665a and 665b by way of example only, the torque measurement sensors 650a and 650b may be located below, on the side of, or proximate the mounting devices 665a and 665b. It will likewise be appreciated that, in some embodiments, instead of having top and bottom torque measurement sensors 650a and 650b proximate the exemplary top and bottom mounting devices 665a and 665b, respectively, as shown in FIG. 6, the shelf 670 may have only one bottom torque measurement sensor 650b proximate the bottom mounting device 665b, and no top torque measurement sensor 650a proximate the top hook-like mounting device 665a.

If the product 690a were located closer to the rear end 674 of the shelf 670 and further away from the front end of the shelf 670, the torque $F_t$ and the torque $F_b$ would be lower, since the product 690a would be closer to the fulcrum-like mounting locations 664a and 664b of the top and bottom mounting devices 665a and 665b to their respective support structures 660a and 660b. Conversely, if the product 690a were located further away from the rear end 674 of the shelf 670 and closer to the front end of the shelf 670, the torque $F_t$ and the torque $F_b$ would be higher, since the product 690a would be further away from the fulcrum-like mounting locations 664a and 664b of the top and bottom mounting devices 665a and 665b to their respective support structures 660a and 660b. Accordingly, the torque (i.e., $F_t$ and/or $F_b$) exerted by the product 690a on the shelf 670 and measured by the torque measurement sensors 650a and 650b provides an indication of the physical location of the product 690a on the shelf, as discussed above with reference to FIGS. 5A and 5B.

Figure 7:
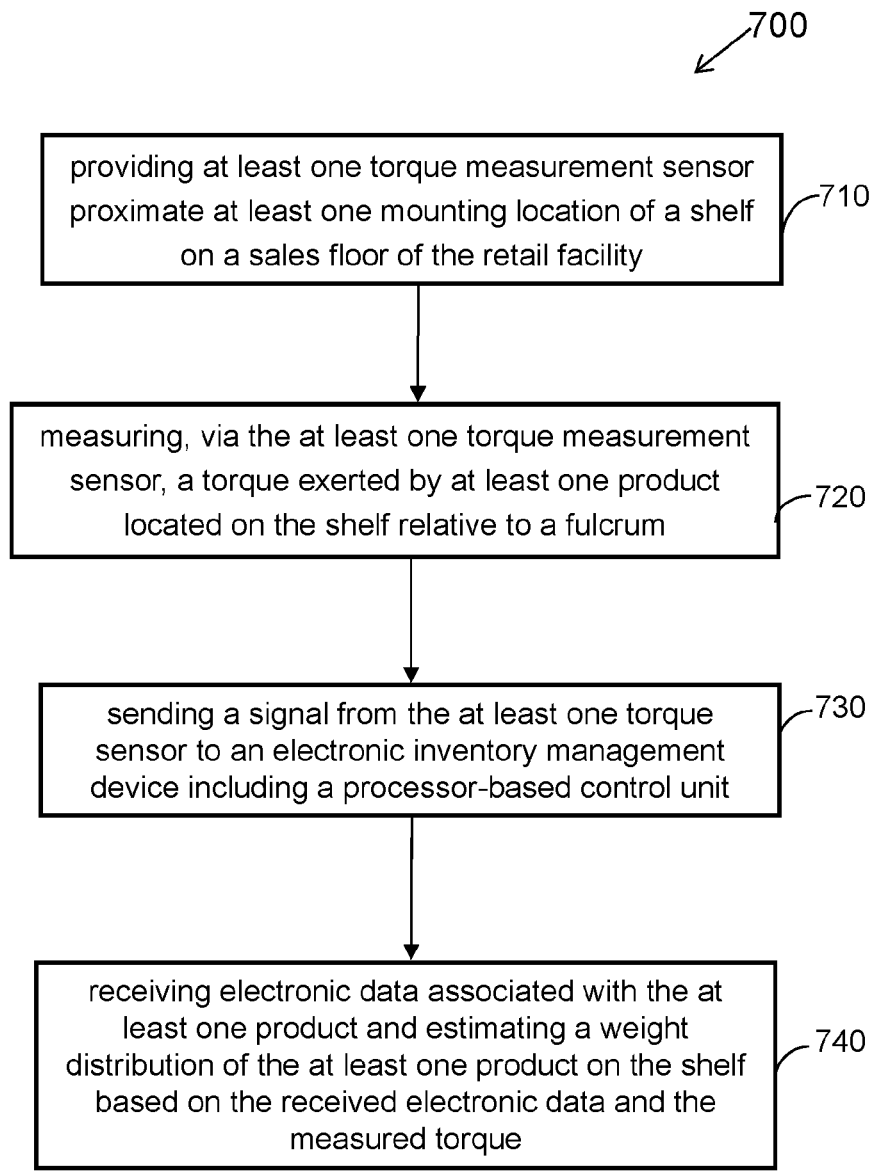
FIG. 7 is a flow diagram of a process of monitoring product placement at a retail sales facility, in accordance with some embodiments.

FIG. 7 illustrates a simplified flow diagram of an exemplary process 700 of monitoring placement of products on shelves at a retail sales facility 110. The method 700 is described in the context of the system 100 of FIG. 1 by way of example only, and it will be appreciated that embodiments of the method 700 may be implemented not only in the system 100, but in other systems. Referring to FIGS. 4A and 7, step 710 of the exemplary method 700 includes providing at least one torque measurement sensor 450 proximate at least one mounting location 464 of a shelf 470 on a sales floor 405 of the retail sales facility 110. FIGS. 4A and 6 illustrate exemplary product display shelves 470 and 670 coupled at mounting locations 464 664a, and 664b via mounting devices 465, 665a, and 665b relative to upstanding support structures 460, 660a, and 660b. As discussed above, the coupling of the mounting device 465 (i.e., a hook) to the upstanding support structure 460 (i.e., an upright and/or bracket) provides for a fulcrum-like structure at the mounting location 464.

In the embodiment of FIG. 4A, one torque measurement sensor 450 is provided to measure a torque exerted by the products 490a-d relative to the fulcrum of the shelf 480, while in the embodiment of FIGS. 5A and 6, two torque measurement sensors 550a, 550b, 650a, and 650b are provided, but it will be appreciated that the number of torque measurement sensors may be larger than two (e.g., 3, 4, 5, 6, or more), and may be chosen based on the size of the shelf and/or the support structure on which the shelf is mounted. In step 720, the torque exerted one or more products 490a-490d located on the shelf 470 relative to a fulcrum at the mounting location 464 is measured via one or more torque measurement sensors 450. After the torque exerted by the products 490a-d located on the shelf 470 relative to the fulcrum at the mounting location 464 is measured by the torque measurement sensor or sensors 450, the next step (step 730) of the exemplary method 700 includes sending a signal from the torque measurement sensor 450 to an electronic inventory management device 120 including a processor-based control unit 210 via the network 115. The torque measurement sensor 450 is configured to transmit the measured torque values via the network 115 to the inventory management database 130 or to the electronic inventory management device 120, which in turn may transmit the torque values received from the torque measurement sensor 450 to the inventory management database 130.

Step 740 of the exemplary method 300 includes receiving electronic data associated with the products 490a-d, and estimating a weight distribution of the products 490a-d on the shelf 470 based on the received electronic data and the torque measured by the torque measurement sensor 450. Examples of electronic data in step 740 may include but is not limited to a unique identifier of each of the products 490a-d, a weight of each product 490a-d, historical torque value data associated with the shelf 470 in general and/or with the individual products 490a-d. As described above, based on a correlation of the torque values provided by the torque measurement sensor 450 to predetermined torque values stored in the inventory management database 130, the control unit 210 of the electronic inventory management device is programmed to determine that one or more of the products 490a-d has been removed from the shelf 470, and to generate a zoning task (i.e., a task instructing the worker to move a product from a position at the rear end 474 of the shelf to a position at the front end 472 of the shelf), and to transmit an appropriate alert, either to a user interface device 140 of a worker at the retail sales facility 110 and/or to an alert interface device 475 located on the shelf 470.

The correlation of the torque measurement values by the control unit 210 against predetermined historical stored torque values for the products 490*a-d* displayed on the shelf 470 permits the control unit 210 to determine how many of products 490*a-d* remain on the shelf 470 and to determine the weight distribution of the products 490*a-d* and/or the locations of each of the remaining products 490*a-d* on the shelf 470. A physical location of any of the products 490*a-d* on the shelf 470 may be determined by correlating the torque measurement data measured by the torque measurement sensors 450 associated with the shelf 470. As described above, based on the torque value measured by each of the torque measurement sensors 550*a* and 550*b*, the control unit 210 determines a distance d1 from the torque measurement sensor 550*a* to the product 590*d* and a second distance d2 from the second torque measurement sensor 550*b* to the product 590*d*, which enables the control unit 210 to estimate the physical location of the product 590*d* on the shelf 570. This estimation of the physical location of the product 590*d* on the shelf 570 enables the control unit 210 to determine whether the estimated position of the product 590*d* on the shelf 570 supports moving the product 590*d* further away from a rear end 574 of the shelf 570 and closer to a front end 572 of the shelf 570 (i.e., to zone the shelf 570).

More specifically, the control unit 210 is programmed in some embodiments to generate an alert indicating that the shelf 570 is to be zoned, i.e., that the product 590*d* is to be moved further away from the rear end 574 of the shelf and closer to the front end 572 of the shelf 570 such that the product 590*d* is easier for the consumers to see and access. In some embodiments, when generating a zoning task, the control unit 210 is also programmed to generate a pick task instructing a worker to go to the stock room of the retail sales facility 110 and to pick additional units of the products 490*a-c* from a storage bin in the stock room, and to bring the picked products 490*a-c* to the sales floor 105 to replenish the empty spaces on the shelf 470.

In some embodiments, the control unit 210 is programmed to cause the electronic inventory management device 120 to send an alert signal to a user interface device 140 of a worker indicating that a zoning task and/or a pick task has been generated for the worker. In some embodiments, the control unit 210 may be programmed to cause the electronic inventory management device 120 to send an alert signal to an alert interface device 575 mounted proximate to the front end 572 of the shelf 570 and configured to generate a visual or an audible alert to a worker when the worker is in physical proximity to the shelf 570, and can either see and/or hear the alert generated by the alert interface device 575, prompting the worker to perform the task of zoning with respect to the shelf 570.

The systems and methods described herein provide for torque measurement-based monitoring of locations of products displayed on the shelves at a retail sales facility and timely generation of shelf zoning tasks for the workers at the retail sales facility without requiring the workers to manually inspect each shelf on the sales floor to determine whether zoning of the shelf is warranted. Accordingly, the systems and methods described herein advantageously improve the on-shelf-availability of products and the efficiency of workers at the retail sales facility, thereby provide for significant cost savings to the retail sales facilities.

Those skilled in the art will recognize that a wide variety of other modifications, alterations, and combinations can also be made with respect to the above described embodiments without departing from the scope of the invention, and that such modifications, alterations, and combinations are to be viewed as being within the ambit of the inventive concept.

What is claimed is:

1. A system for monitoring product placement on shelves at a retail sales facility, the system comprising:
   at least one torque measurement sensor proximate at least one mounting location of a shelf on a sales floor of the retail facility, the at least one torque measurement sensor being configured to measure a torque exerted by at least one product located on the shelf relative to a fulcrum of the shelf and to send a signal to an electronic inventory management device including a processor-based control unit;
   wherein the control unit is configured to receive electronic data associated with the at least one product and estimate a weight distribution of the at least one product on the shelf based on the received electronic data and the measured torque;
   wherein the control unit is further configured to correlate the measured torque to a predetermined threshold torque value associated with the at least one product on the shelf and stored in an electronic database in communication with the electronic inventory management device; and
   wherein the control unit is further configured to estimate a position of the at least one product on the shelf in response to a determination by the control unit that the measured torque value is below the predetermined threshold torque value stored in the electronic database.

2. The system of claim 1, wherein the shelf is mounted via at least one top hook and at least one bottom hook, and further comprising one torque measurement sensor proximate the at least one bottom hook and no torque measurement sensor proximate the at least one top hook.

3. The system of claim 1, wherein the shelf is mounted via at least one top hook and at least one bottom hook, and further comprising one torque measurement sensor proximate each of the top and bottom hooks.

4. The system of claim 1, wherein the control unit is further configured to determine a distance of the at least one product on the shelf relative to the at least one torque measurement sensor.

5. The system of claim 1, wherein the control unit is further configured to:
   determine an estimated position of the at least one product on the shelf based on at least the received electronic data and the signal received from the torque measurement sensor;
   determine that the estimated position of the at least one product on the shelf supports moving the at least one product on the shelf further away from a rear end of the shelf and closer to a front end of the shelf; and
   generate an alert indicating that the at least one product on the shelf is to be moved further away from a rear end of the shelf and closer to a front end of the shelf.

6. The system of claim 1, wherein the control unit is further configured to determine, based on at least the signal received from the torque measurement sensor, that the at least one product was removed from the shelf, and to generate an alert indicating that at least one product identical to the at least one product removed from the shelf is to be brought from a stock room and placed on the shelf to replace the at least one product removed from the shelf.

7. The system of claim 1, wherein the at least one torque measurement sensor is configured to send the signal to the electronic inventory management device at regular predetermined time intervals.

8. The system of claim 1, wherein the control unit is further configured to generate at least one of a visual and audible alert at the electronic inventory management device and to transmit the at least one of a visual and audible alert to a product scanning device of a worker at the retail sales facility.

9. A method of monitoring product placement on shelves at a retail sales facility, the method comprising:
  providing at least one torque measurement sensor proximate at least one mounting location of a shelf on a sales floor of the retail facility;
  measuring, via the at least one torque measurement sensor, a torque exerted by at least one product located on the shelf relative to a fulcrum;
  sending a signal from the at least one torque measurement sensor to an electronic inventory management device including a processor-based control unit;
  receiving electronic data associated with the at least one product and estimating a weight distribution of the at least one product on the shelf based on the received electronic data and the measured torque;
  wherein the measuring step further comprises correlating the measured torque to a predetermined threshold torque value associated with the at least one product on the shelf and stored in an electronic database in communication with the electronic inventory management device; and
  wherein the estimating step further comprises estimating a position of the at least one product on the shelf in response to determining by the control unit, that the measured torque is below the predetermined threshold torque value stored in the electronic database.

10. The method of claim 9, wherein the shelf is mounted via at least one top hook and at least one bottom hook, and wherein the providing step further comprises providing one torque measurement sensor proximate the at least one bottom hook and no torque measurement sensor proximate the at least one top hook.

11. The method of claim 9, wherein the shelf is mounted via at least one top hook and at least one bottom hook, and wherein the providing step further comprises providing one torque measurement sensor proximate each of the top and bottom hooks.

12. The method of claim 9, wherein the estimating step further comprises determining a distance of the at least one product on the shelf relative to the at least one torque measurement sensor.

13. The method of claim 9, wherein the estimating step further comprises:
  determining an estimated position of the at least one product on the shelf based on at least the received electronic data and the signal received from the torque measurement sensor;
  determining that the estimated position of the at least one product on the shelf supports moving the at least one product on the shelf further away from a rear end of the shelf and closer to a front end of the shelf; and
  generating an alert indicating that the at least one product on the shelf is to be moved further away from a rear end of the shelf and closer to a front end of the shelf.

14. The method of claim 9, wherein the determining step further comprises determining, based on processing of at least the signal received from the torque measurement sensor by the control unit, that the at least one product was removed from the shelf, and generating an alert indicating that at least one product identical to the at least one product removed from the shelf is to be brought from a stock room and placed on the shelf to replace the at least one product removed from the shelf.

15. The method of claim 9, wherein the sending step further comprises sending the signal from the at least one torque measurement sensor to the electronic inventory management device at regular predetermined time intervals.

16. The method of claim 9, wherein the generating an alert further comprises generating at least one of a visual and audible alert at the electronic inventory management device and transmitting the at least one of a visual and audible alert to a product scanning device of a worker at the retail sales facility.

* * * * *